Figure 3:
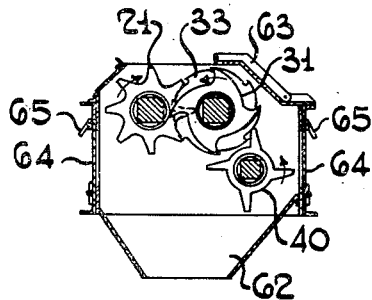

Feb. 22, 1949.   H. H. VICKERS   2,462,692
TEARING AND DIVIDING EQUIPMENT
Filed May 4, 1945   3 Sheets-Sheet 1
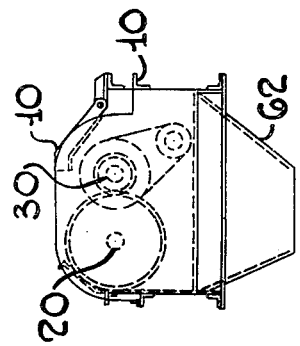
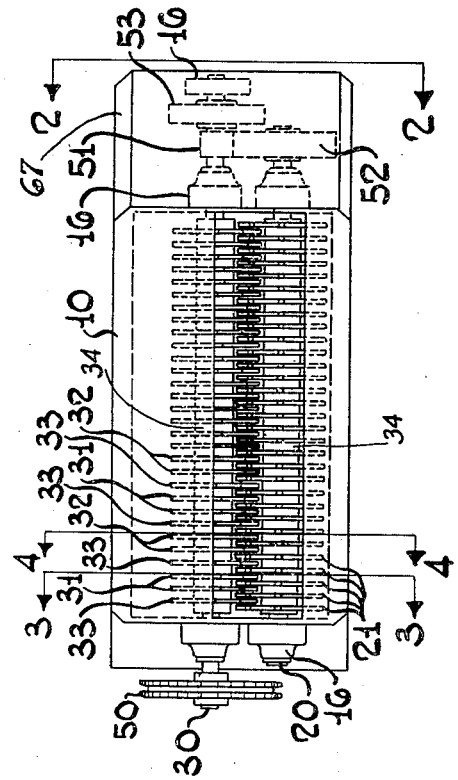
Herbert H. Vickers  Inventor
By W. E. Currie  Attorney Feb. 22, 1949.  H. H. VICKERS  2,462,692
TEARING AND DIVIDING EQUIPMENT
Filed May 4, 1945  3 Sheets-Sheet 2

Herbert H. Vickers Inventor
By W. E. Currie Attorney

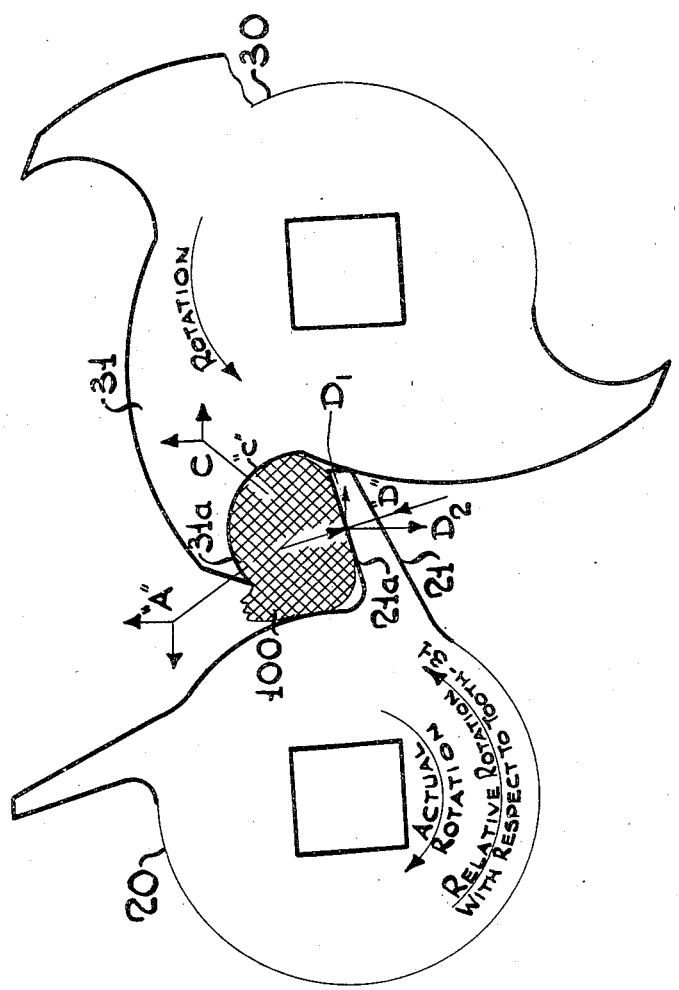

UNITED STATES PATENT OFFICE 2,462,692

TEARING AND DIVIDING EQUIPMENT

Herbert H. Vickers, Union, N. J., assignor to Standard Oil Development Company, a corporation of Delaware Application May 4, 1945, Serial No. 591,880

6 Claims. (Cl. 146—122)

This invention relates to the art of shredding equipment, and in particular to machinery for tearing and reducing bulk quantities of such materials as relatively adhesive plastics into sizes that can be easily handled in conveyors and suitable for subsequent treatment in extruders and roll mills.

In the processing of relatively adhesive plastics such as natural and synthetic rubber, the crude material is obtained in large sheets or blankets. This material for further processing has to be torn into small parts suitable for treatment in roll mill and extruder equipment. In the past, this tearing and dividing operation has been effected by subjecting the sheets of crude material to the action of teeth on rolls moving at high speeds. This treatment, however, produces a discharge that is often too fine. Moreover, with the machinery involved, clogging often occurs, power consumption is high, and the wear and tear factor is of substantial significance. The machine of this invention, in contrast, produces a more workable sized effluent, is non-clogging, and the power consumption and maintenance factors involved are considerably lower than those with the high speed equipment presently employed.

The equipment of the present invention consists essentially of two rolls rotating toward each other at relatively low speeds carrying differently designed teeth projecting respectively with slight clearance into the spaces between the rolls and the teeth on the other roll. The rotation of the rolls and number of teeth on each roll are such that when the slower moving roll presents teeth in a horizontal position, the hook points of the teeth on the other roll are also in a horizontal plane, and also that in the movement downward of these claw points the entire back cutting edges of the teeth on the slower moving roll are passed with slight clearance, so that material seized by the teeth on the faster moving roll is first compressed and cut by the relative movement of the teeth on the two rolls, then undergoes a gradual release of compression near the base of the faster moving roll and finally is raked off the teeth of the slower moving roll by the activity of the next following claw tooth of the faster moving roll. Thus, the movement of these rolls coupled with the character of the teeth are designed to tear and divide the plastic material. Also, the movement of the faster moving roll cooperates with the movement of a doffer roll functioning as a cleaner for the teeth on the faster moving of the two primary rolls.

The effectiveness of the two relatively slow-moving rolls for tearing and dividing the plastic material is thus not a function of the speeds of rotation but due to the shape of the teeth and to the timing of the movement of these two rolls. Moreover, the teeth are also designed and arranged upon the rolls so that the proper degree of tearing is obtained with the minimum load upon the driving mechanism. Furthermore, as a result of the relatively slow speeds with which the rolls move, operation of the machine is effected by means of a relatively small motor which is geared down to slow speeds so that the torque capacity of the machine is high, excessive noise and vibration are eliminated, and savings are effected in power consumption as compared to the high speed type equipment more commonly employed.

Figure 4:
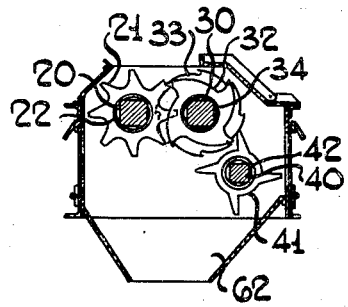
Figure 5A:
Figure 5B:
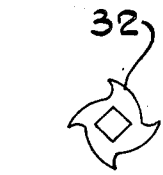
Figure 5C:
Figures 5D, 5E:
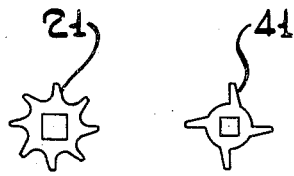
Figure 6A:
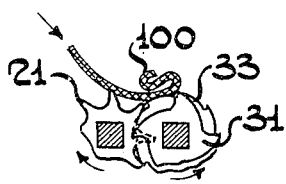
Figure 6B:
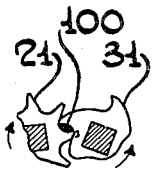
Figure 6C:
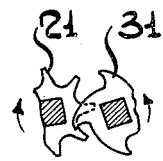

In order that the invention may be more fully understood, the following description and illustration will be presented of a machine constructed according to the invention. Figure 1 is a plan view of such a machine. Figure 2 is an end view along the line 2—2 of Figure 1. Figure 3 is a sectional view of the machine along the line 3—3 of Figure 1. Figure 4 is a similar sectional view of the machine taken along the line 4—4 of Figure 1. Figures 5 (a), (b), (c), (d) and (e) illustrate particular features of the teeth in the machine; and Figures 6 (a), (b), (c), and Figure 7 show details with regard to the functioning of the various teeth. Similar parts in the various illustrations are designated by similar numerals.

The machine is shown as consisting of a metal frame and housing 10 in which are mounted in bearings 16 and geared together three parallel tooth rolls 20, 30 and 40. These rolls are constructed and spaced so that the projecting teeth of each roll rotate with slight all-round clearance in the space between the teeth of the adjacent roll. The two top rolls 20 and 30, as shown, are of substantially equal diameter, may be termed the tearing rolls, while the lower roll 40, of substantially greater diameter, the teeth on which move with slight clearance from roll 30, may be termed a doffer or cleaning roll.

The roll 30 is driven, at a rate in this machine of about 4 R. P. M., by a heavy chain from a gear reduced motor acting on the chain sprocket 50. This roll consists of a squared shaft on which are mounted the shearing cutters 31 and 32 and also the dividing cutters 33. The cutters are separated by spacing rings 34. The shearing cutters 31 and 32 differ only in the relation of their hooks to the squared hole that locks them on the shaft.

The shearing cutters are mounted in pairs, two of each type 31 or 32. Moreover, each pair is separated by the dividing cutters 33. The pairs of shearing cutters are so arranged that the hook points are midway between the hook points on the adjacent series of the shearing cutters on the same shaft. This stagger arrangement of the teeth points provides for relatively uniform loading of the machine.

On the opposite end of the tearing roll 30 from the chain drive sprocket 50 there is mounted a small diameter spur gear 51 which drives a larger spur gear 52 mounted on the second tearing roll 20. The roll 20 in the machine of the illustration is driven at one-fourth the speed of roll 30. Also on the shaft of the roll 30 is mounted a large chain sprocket 53 which drives the third or doffer roll 40 at a speed approximately three times as fast as the driven roll 30. The gears and sprockets run in an oil bath. The entire gear and sprocket assembly is housed in an oil-tight metal casing 67.

The roll 20 consists of a squared shaft similar to roll 30. Mounted on this roll 20 are the teeth or cutters 21 which are separated by the spacing rings 22. These teeth function on the roll partly as star feeder but mainly as a comb for the faster moving teeth on the roll 30 to pass through. The roll 20 moving at about 1 R. P. M. with the undercut character of the teeth 21 presents a row of teeth in approximately horizontal position for a pass of the hook portion of the teeth 31 and 32 and the small holding hooks 35 on the dividing cutter 33; and also a row of teeth in a dependent position for the raking action of other teeth on roll 30. This interaction of the teeth upon rolls 20 and 30 is shown in more detail in Figures 6 (b), (c), and 7, as being first of the nature of a shearing action upon material confined in the clearance spaces between the teeth and then a raking action of the ends of the teeth 31 upon the back edge of the teeth 21. In Figure 7, the teeth 21 are shown as of an under-cut character with the cutting edge 21 (a) on the back or side averse to or trailing the direction of motion of the roll. The teeth 31 on the roll 30 are shown as being claw-shaped with hooked ends or claw points 31 (a).

The claw-shaped tearing roll teeth 31 bear down upon the material 100 supplied to the machine and squeeze it against the slower revolving under-cut comb roll teeth 21.

The claw 31 (a) functions to hold the material 100 upon the teeth 21. The claw 31 (a) constricts the material within the hooked teeth 31 and builds up a reaction A the horizontal component of which is opposed to the horizontal component of the force at C, thereby neutralizing and reducing the horizontal forces upon the the shaft of the tearing roll 30. The teeth 21 resist the material 100 by setting up a reaction D, and the material produces a reaction which is equal and opposite to D. This reaction is at right angles to the face of the backward sloping teeth 21, and it may be resolved into horizontal and vertical components $D_1$ and $D_2$. The vertical component $D_2$ tends to rotate the roll and the horizontal component $D_1$ tends to draw the roll 20 towards roll 30, neutralizing to some degree the squeezing forces between and against roll 20. It is the function of this cross-hooking effect of the teeth on rolls 20 and 30 that neutralizes the squeezing pressures that remain and avoids the great squeezing pressures that would occur if these hook shapes were not employed. Moreover, in the passage downward of the teeth 31 the confined material 100 undergoes a progressive release of pressure at the base of the teeth which causes an escape or rolling reaction of the material from the surfaces of the teeth. It is the functioning and interrelation between the speed of the rolls 20 and 30 and the design of the teeth rather than the degree of slope or the depth of the hook which are the particular features of this invention.

The comb roll teeth 21 are flat rather than curved so as to be easily cleaned by the second sweep or raking action they receive from the tearing roll teeth 31.

The doffer roll 40 consists of a squared shaft having mounted thereon the doffer teeth 41 separated by the spacing rings 42. These teeth are arranged to pass with slight clearance between and on either side of the shearing and dividing cutters 31, 32 and 33. These teeth pass close to the teeth 31, 32, 33 and spacer rings 34 on the roll 30 so as to remove any adherent material. The doffer roll 40 travels at a speed sufficiently high—in this case about 12 R. P. M.—that, owing to the tapered nature of the teeth and the centrifugal force developed, any product adhering to the roll and teeth is thrown off and caused to fall into the lower receiving portion 62. The doffer roll is thus the only roll which has a minimum speed limit.

In the operation of the machine, the product is fed into the top and is torn into the proper sizes as required by the two top shearing rolls 20 and 30. The sized product falls off the tearing rolls or is raked off by the after-sweep of the cutting teeth or the teeth of the doffer roll 40 and is deposited in the hopper 62, located below. From the hopper 62 the material may be discharged into conveyors or directly into succeeding equipment for further processing. The hook-shaped teeth as shown in Figures 5 (a), 5 (b) and 6 (a) seize the product and tear it through the slower revolving comb roll 20. As the comb roll continues to revolve, it later presents the same row of teeth at approximately 45° in a downward sloping position to the cleaning sweep of the following hooks on the faster roll 30. This action is shown in the design of the comb roll teeth in Figure 5 (d) and the details in Figure 6 (c).

The function of the small hooks 35 on the dividing cutter 33 is to bite into and hold the product while an adjacent pair of shearing cutters 31 or 32 do the tearing work. These small holding hooks contained between each two successive dividing cutters 33 avoid the pulling down through the machine of long strings of product in somewhat a channeling effect and thus avoid the shredding action. The dividing cutters also partly hold back the feed until the smaller hooks 35 tear through and slowly permit the product to be drawn into the bite of the larger hooks of cutters 31 and 32. The arrangement and design of the teeth on the various rolls tend to equalize the load even though large amounts of material may be suddenly fed to the machine. The large hooks on the tearing cutters 31 and 32 effect, by reason of the deep shape of the hooks, a seizing of the product and the constriction of the material held into the apex of the hooks, drawing it down into a common center between the tearing rolls. In this manner, shearing is done in a horizontal plane with the resultant loads in a vertical manner rather than against the shafts themselves. This hooking and constricting action of the machine prevents the pushing and squeezing of the material as would otherwise occur with cutters of flatter design, and thus eliminates excessive pressures between the tearing rolls.

The machine as thus described and illustrated is very rugged and self-cleaning when used with a material of adhesive nature such as synthetic rubber. The material, on being fed into the upper rolls 20 and 30 rotating toward each other, is torn by the action of the claw-shaped teeth on the faster roll 30 passing down and through the slower moving under-cut teeth on the roll 20. The under-cut teeth 21 are cleaned by the second sweep from the claw-shaped teeth 31 (a) on the faster moving roll. The claw-shaped teeth 31 (a) on the roll 30 are then cleaned by the teeth on the doffer roll 40 revolving between them. The teeth on the doffer roll are self-cleaning by reason of the centrifugal force developed by reason of the speed of rotation, the shape of the teeth, and the fact that, in the case of the doffer roll teeth, the product is only slightly impinged upon them as there is no shearing effect present in their action. The operation of the machine in connection with plastic material of the character of Butyl rubber produces convenient workable sized pieces of material from the crude blanket form. The worked pieces, moreover, leave the machine without either crumbling or balling in a sticky mass on the rolls.

The machine is also convenient for assembling and repairing. Access to the rolls is obtained by means of the swing cover 63 on the top and the hinged doors 64 on both sides equipped with gravity closing handles 65.

In this embodiment of the invention, particular designs of teeth 21 and 31 have been stressed in relation to the employment of definite speeds of the rolls 20, 30 and 40. Machines designed according to the invention are not, however, restricted to such teeth designs or to the use of such speeds nor to the specific relationship of the speeds stated. The essential feature of the invention is that three rolls cooperate at relatively slow speed rotation and the main tearing roll 30 is cleaned by a doffer roll 40 and the second tearing roll 20 is cleaned through the action of the teeth on the roll 30. The speed of the various rolls and the relationship between the speeds is bound up with the design and arrangement of the teeth on the various rolls so as to permit the proper sizing of the product. In general, however, with claw-shaped teeth on the faster moving of the two primary rolls, under-cut teeth on the other primary roll, and a typical doffer roll teeth on the doffer roll, the ratio of the speeds, in terms of the rolls designated in the illustration, should be that roll 30 moves four times as fast as roll 20 and the doffer roll moves twelve times as fast as roll 20.

The minimum rotation of roll 20 in this particular machine as illustrated is generally considered to be about ¼ R. P. M. and a high value of 100 R. P. M., both being governed by the speed of the doffer roll to which they are directly geared. With the use of a different gear ratio between the doffer roll 40 and the tearing roll 30 or a separate direct drive on the doffer roll, there is practically no low limit for the two tearing rolls 20 and 30 other than that dictated by the feed stock. The doffer roll 40, however, has a low limit governed by the peripheral speed which must be sufficient to develop enough centrifugal force to clean itself. The high speed limits are purely mechanical and go far beyond the requirements of this normally slow speed machine.

Variations in the relation of the speeds may be made based upon particular design features of the teeth. The dependency of the relation of the speeds upon the character of the teeth is due to the need for obviating pressures between the various rolls, especially between the two primary rolls (20 and 30) occurring as a result of the squeezing of the material (100) between the rolls: this factor is particularly illustrated in Figure 7. Such variations in the speed ratio are considered within the scope of the invention in view of the explanation of the functioning of the machine presented in Figure 7.

Thus, in the design of equipment according to the invention the comb roll (20) teeth are so shaped and located that after they have done their shearing work in the horizontal plane they move downward and present their face to a cleaning sweep of the following cutter teeth (roll 30). The doffer teeth are tapered and travel at a higher speed, thus throwing off any material they have removed in their sweep of the cutter roll 30. The dividing cutters 33 are so made, shaped and located as to divide pairs or sets of cutter teeth (roll 30) located on the same shaft with their teeth staggered with respect to the teeth of the adjacent sets, thus distributing the load on the rolls. The function of these dividing cutters is to prevent long pieces of product being drawn down between the cutter and comb rolls without being properly disintegrated. The dividing cutters also function to hold back to some extent the feed until the smaller teeth tear through and permit the product to be drawn into the range of the deeper cutter teeth. Hook-shaped or claw-shaped cutter teeth on roll 30 are made so as to seize the product and constrict it into the apex of the hook, while shearing out against the comb cutters (roll 20). This hooking and constricting action prevents the pushing and squeezing that would normally occur with a cutter of flatter design and thus largely eliminates the otherwise excessive pressure between the two shafts.

What is claimed is:

1. A self-cleaning tearing and dividing machine for semi-adhesive plastic material which comprises a comb roll and a cutting roll, said rolls rotating toward each other at differential speeds, the slower moving comb roll carrying radially equi-spaced, substantially flat teeth, the faster moving cutting roll carrying radially equi-spaced claw-shaped teeth curved forwardly to expose a concave edge in the direction of rotation and thereby adapted to exert a gripping action against the material held by the trailing edge of said flat teeth, the said cutting roll also carrying in a position longitudinally intermediate to said claw-shaped teeth dividing discs of substantially the same maximum radius as the said claw-shaped teeth, the two rolls being so mounted that the said discs and teeth of the cutting roll are adapted to cut through the spaces between the teeth of the comb roll with slight clearances from each other and from the rolls, the speeds of rotation and the number of teeth on each roll being such that said comb roll presents a row of teeth in a given plane when claw points on said cutting roll are in the same plane, the coaction of said two rolls being such that after one set of claw-shaped teeth has cut through the plastic by shearing said plastic against the opposing flat teeth, said flat teeth, during movement downward, are overtaken by the next following set of claw-shaped teeth of the faster following roll which claw-shaped teeth pass sweepingly alongside the trailing edges of said flat teeth in a parting direction outwardly and downwardly from the center of the roll carrying the said flat teeth.

2. A self-cleaning tearing and dividing machine according to claim 1, in which the various claw-shaped cutting teeth are located in a staggered relationship.

3. A self-cleaning tearing and dividing machine according to claim 1, in which the cutting edges are located on the leading, concave side of the claw-shaped teeth and on the trailing side of the flat teeth.

4. A self-cleaning tearing and dividing machine according to claim 1, in which the circumference of said dividing discs is provided with small teeth.

5. A self-cleaning tearing and dividing machine for semi-adhesive plastic material which comprises a comb roll and a cutting roll, means for rotating said rolls toward each other at differential speeds, the comb roll carrying radially projecting comb teeth in rows circumferentially spaced, the cutting roll carrying arcuately shaped cutting teeth with a concave leading edge, said cutting teeth being arranged in circumferentially spaced rows and positioned opposite the spaces between the comb teeth, the cutting roll also carrying discs interspaced between the cutting teeth and of substantially the same maximum radius as said cutting teeth, this maximum radius being such that the several teeth and discs of one roll project into the spaces between the teeth of the other roll with slight clearances from the other roll and from the teeth thereon, the speeds of rotation and the number of teeth on each roll being such that the number of cutting teeth passing through any given position is at least twice the number of comb teeth passing through any given position in the same time interval.

6. Apparatus for tearing and dividing bulk, semi-adhesive, plastic materials, comprising a comb roll, a plurality of toothed disc and spacer ring members alternately disposed longitudinally of a rotatable shaft to form said comb roll, a cutting roll of substantially equal diameter to said comb roll, a plurality of toothed, cutting and dividing disc members and spacer ring members disposed longitudinally of a rotatable shaft to form said cutting roll, the outer roll end disc members and every third intermediate disc member being a dividing disc, with paired cutting disc members between intermediate and end dividing disc members, the spacer rings on said cutting roll shaft disposed between each disc member separating one from another, said comb and cutting rolls disposed in opposed longitudinal relation with the discs of one roll extending into the spaces between discs of the other roll into peripherally spaced relation to the spacer rings thereof, a plurality of toothed doffer disc members and spacer ring members alternately disposed on a rotatable shaft to form said doffer roll, said doffer roll disposed in opposed longitudinal relation to said cutting roll with the doffer disc members extending into the spaces between said cutting roll discs into peripherally spaced relation to the spacer rings on said cutting roll, said comb and cutting rolls oppositely rotatable toward each other, and said cutting and doffer rolls rotatable in the same direction, through their respective shafts, a plurality of substantially flat radial teeth disposed in equi-spaced relation peripherally of said comb roll disc members, a plurality of claw-like radial teeth disposed in equi-spaced relation peripherally of said cutting disc members, each tooth exposing a concave edge in the direction of rotation towards said comb roll disc teeth, and thereby adapted to exert a gripping action against material held by the trailing edge of said comb roll disc teeth, a plurality of shallower, claw-like, radial teeth disposed in equi-spaced relation peripherally of said dividing disc members, primarily adapted to draw portions of said bulk material into engagement by said comb and cutting disc members, a plurality of elongated, tapered teeth on said doffer disc members, and means for rotating said rolls, through their shafts, at differential speeds of substantially increasing rate from comb roll to doffer roll, the relative speed of rotation and number of teeth on each of said comb and cutting disc members being such that said comb disc members present a row of teeth in a given plane when claw points on said cutting disc members are in the same plane, with coaction between the disc teeth such that after one set of cutting disc teeth has cut through the plastic material held by the opposed comb disc teeth, by shearing said plastic against the opposed comb disc teeth, the latter, during movement from said plane, are overtaken by the next following set of cutting disc teeth of the faster moving cutting roll to pass sweepingly along the trailing edge of the comb disc teeth in a parting direction outwardly from the roots of said comb disc teeth, and the speed of rotation of said doffer roll being such that the centrifugal force developed, coupled with the tapered shape of the doffer disc teeth will throw off any material removed from said cutting roll disc and adhering to said doffer disc teeth.

HERBERT H. VICKERS.

REFERENCES CITED

The following references are of record in the file of this patent:

UNITED STATES PATENTS

| Number | Name | Date |
|---|---|---|
| 35,472 | Richardson | June 3, 1862 |
| 261,478 | Parker | July 18, 1882 |
| 431,638 | Zimmerman et al. | July 8, 1890 |
| 803,526 | Cunning | Oct. 31, 1905 |
| 926,168 | Cadingan | June 29, 1909 |
| 1,419,407 | Pardee | June 13, 1922 |
| 1,435,330 | Pardee | Nov. 14, 1922 |
| 1,477,502 | Killick | Dec. 11, 1923 |
| 1,706,935 | Milne | Mar. 26, 1929 |
| 2,081,460 | Lorentz | May 25, 1937 |